(12) United States Patent
Nakano

(10) Patent No.: US 8,688,164 B2
(45) Date of Patent: Apr. 1, 2014

(54) RADIO COMMUNICATION SYSTEM, RADIO BASE STATION, AND BLOCKADE CONTROL METHOD

(75) Inventor: Shinji Nakano, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 219 days.

(21) Appl. No.: 13/203,423

(22) PCT Filed: Feb. 25, 2010

(86) PCT No.: PCT/JP2010/053002
§ 371 (c)(1),
(2), (4) Date: Aug. 25, 2011

(87) PCT Pub. No.: WO2010/098403
PCT Pub. Date: Sep. 2, 2010

(65) Prior Publication Data
US 2011/0319125 A1    Dec. 29, 2011

(30) Foreign Application Priority Data

Feb. 25, 2009 (JP) ................................. 2009-043192
Jun. 17, 2009 (JP) ................................. 2009-144055

(51) Int. Cl.
*H04B 7/00* (2006.01)
(52) U.S. Cl.
USPC ............................ 455/522; 455/524; 455/525
(58) Field of Classification Search
USPC ......... 455/443, 445, 453, 522, 524, 525, 560, 455/561, 567
See application file for complete search history.

(56) References Cited

U.S. PATENT DOCUMENTS

| | | | |
|---|---|---|---|
| 6,628,933 B1* | 9/2003 | Humes | 455/404.1 |
| 2007/0173279 A1* | 7/2007 | Kuroda et al. | 455/522 |
| 2009/0111450 A1* | 4/2009 | Okita et al. | 455/418 |
| 2009/0201801 A1 | 8/2009 | Ono | |
| 2009/0209271 A1* | 8/2009 | Reed et al. | 455/456.6 |
| 2009/0280811 A1* | 11/2009 | Kida et al. | 455/436 |

FOREIGN PATENT DOCUMENTS

| | | |
|---|---|---|
| JP | 2005-286970 A | 10/2005 |
| JP | 2006-005395 A | 1/2006 |
| WO | 2008/050388 A | 5/2008 |

OTHER PUBLICATIONS

International Search Report and Written Opinion dated Jun. 1, 2010 issued by the Japanese Patent Office for International Application No. PCT/JP2010/053002.

* cited by examiner

*Primary Examiner* — Ping Hsieh
*Assistant Examiner* — Xin Jia
(74) *Attorney, Agent, or Firm* — Procopio, Cory, Hargreaves & Savitch LLP

(57) ABSTRACT

A radio base station (1), which is to be pre-blockaded, transmits a pre-blockade initiate notification to radio base stations (2A-2F) neighboring the radio base station (1). Further, the radio base station (1) reduces the transmission power thereof at a predetermined reduction rate at a initiation time of the pre-blockade. Meanwhile, each of the radio base stations (2A-2F) receives the pre-blockade initiate notification and increases the transmission power at a predetermined increase rate at the initiation time of the pre-blockade, the absolute value of predetermined increase rate being equal to that of the predetermined reduction rate at the radio base station (1).

17 Claims, 8 Drawing Sheets

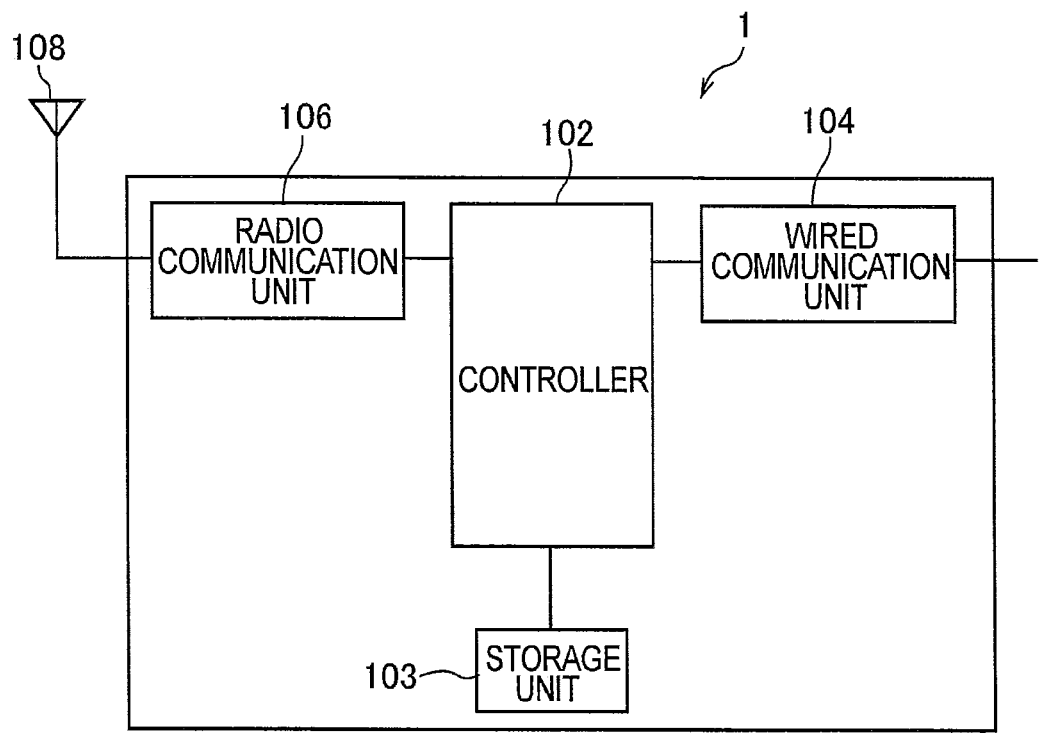
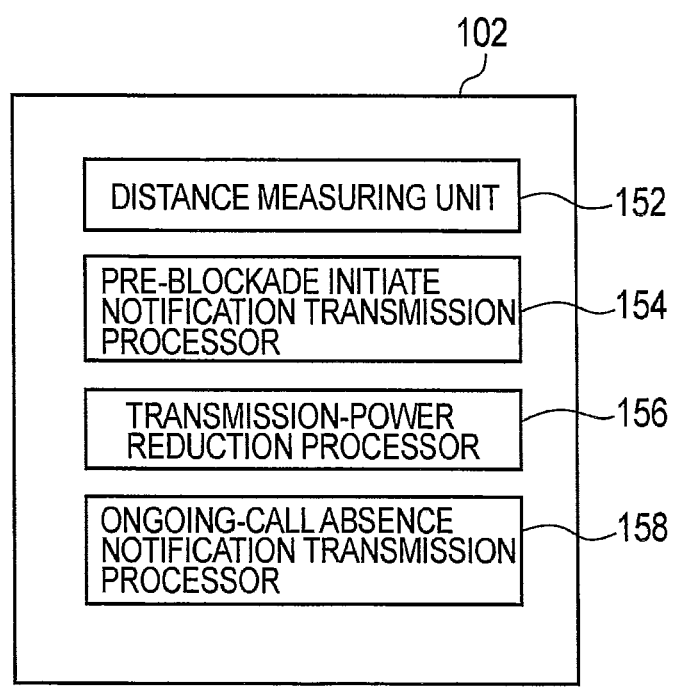

| BASE STATION ID | LONGITUDE · LATITUDE |
|---|---|

| TRANSMISSION SOURCE BASE STATION ID | DESTINATION BASE STATION ID | TRANSMISSION -POWER REDUCTION RATE | PRE-BLOCKADE INITIATION TIME |
|---|---|---|---|

| TRANSMISSION SOURCE BASE STATION ID | DESTINATION BASE STATION ID | POWER CUT TIME |
|---|---|---|

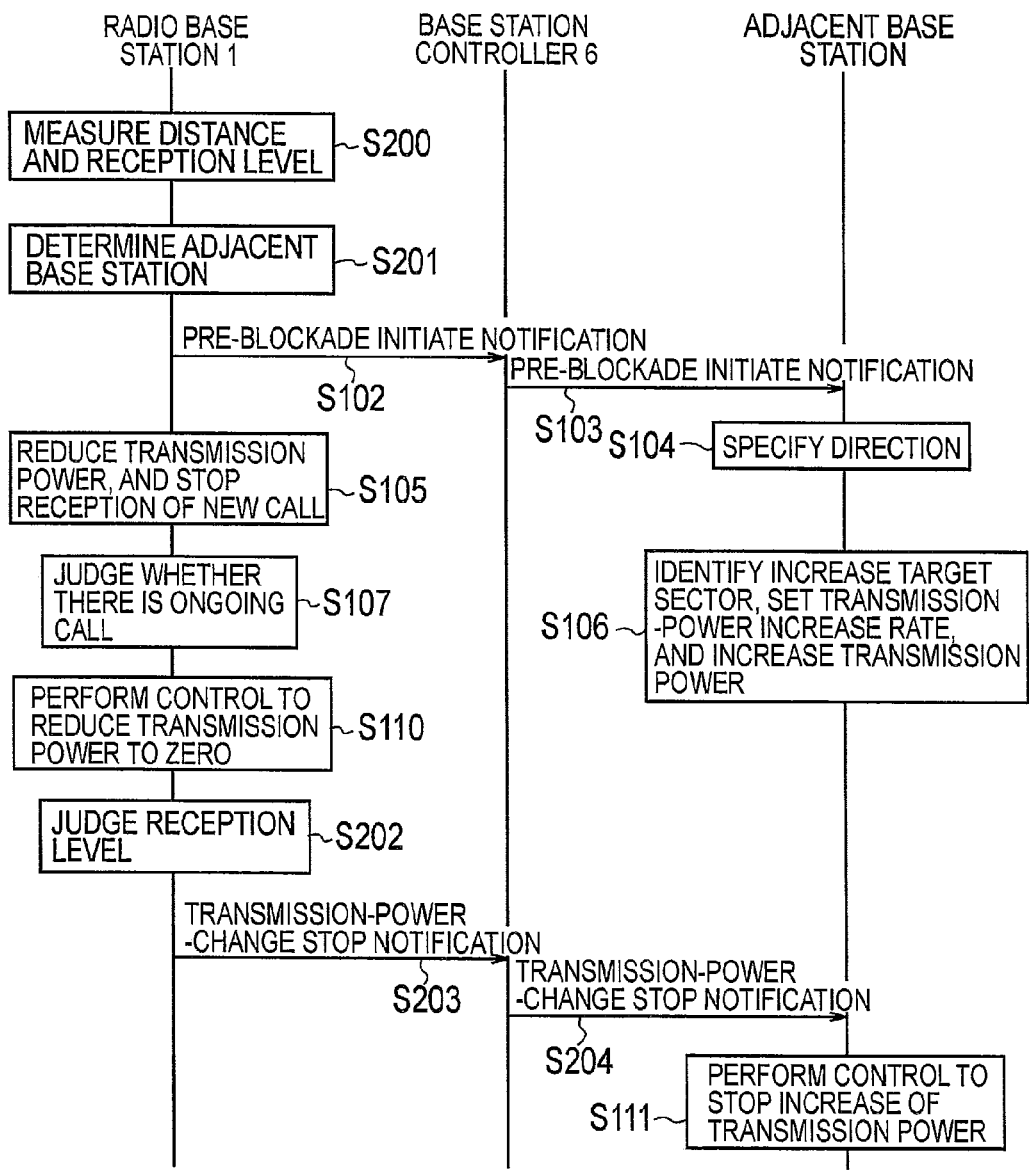

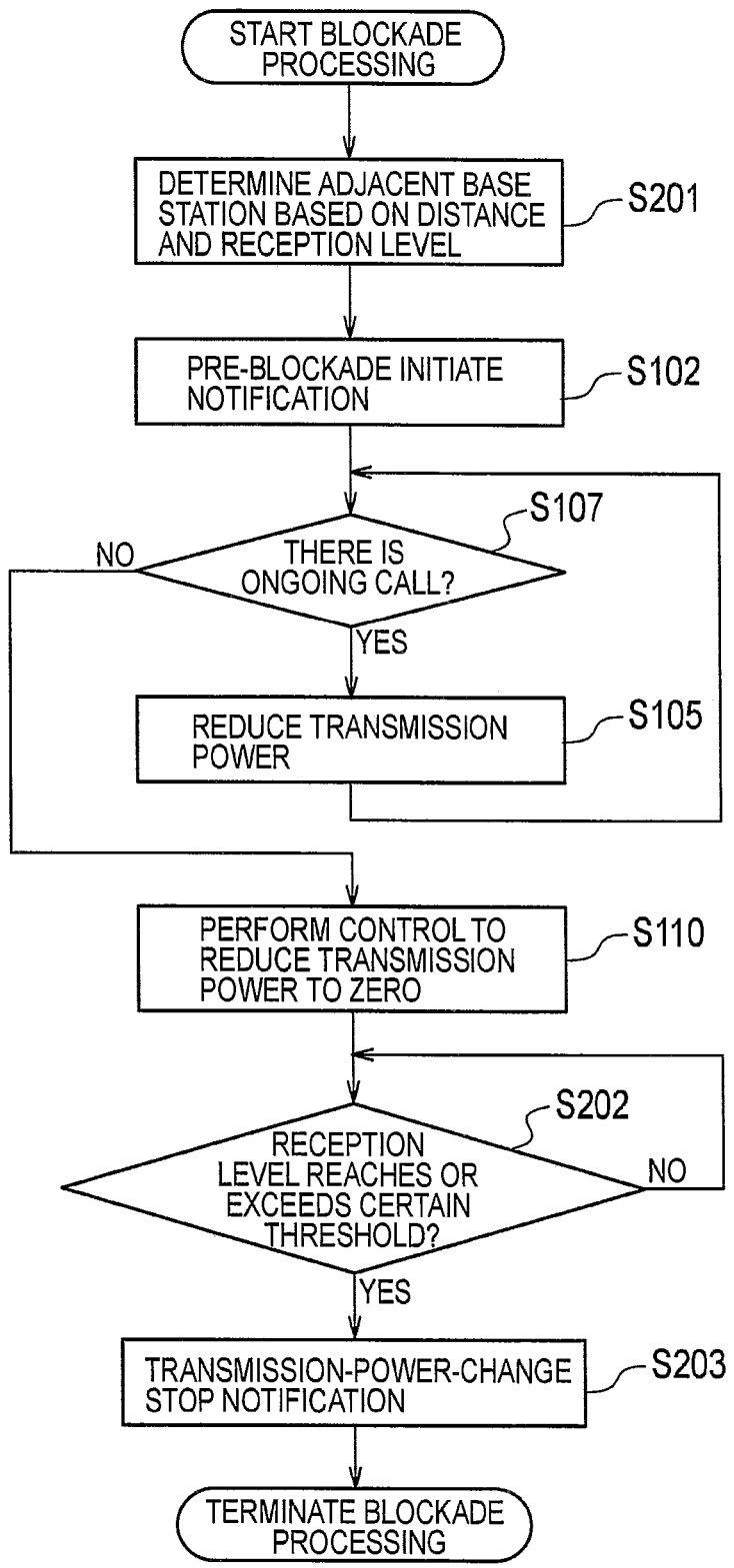

RADIO COMMUNICATION SYSTEM, RADIO BASE STATION, AND BLOCKADE CONTROL METHOD

TECHNICAL FIELD

The present invention relates to a radio communication system including multiple radio base stations, a radio base station in the radio communication system, and a blockade control method in the radio communication system.

BACKGROUND ART

In a radio communication system, a radio base station performs processing (blockade processing) to turns off transmission power in the case where maintenance or the like of the radio base station is to be performed. In the blockade processing, the radio base station is set to receive no new call which is a call newly made by a radio terminal. Moreover, if there is an ongoing call which is a call currently in communication between the radio terminal and the radio base station, the radio base station waits until the ongoing call is terminated, and turns off transmission power after the termination. Such processing of waiting the termination of ongoing call is called pre-blockade processing. Note that, if there is an ongoing call even after a predetermined time period from the start of the blockade processing, the radio base station forcefully disconnects the ongoing call, and turns off the transmission power (For example, see Patent Document 1).

PRIOR ART DOCUMENT

Patent Document

Patent Document 1: Japanese Patent Application Publication No. 2006-5395

SUMMARY OF THE INVENTION

However, in the method of the conventional blockade processing described above, if a radio terminal located in a coverage area (cell) of a radio base station before the blockage processing becomes located outside the cell due to the blockage processing, the radio terminal cannot receive anymore a new call which can be received before the blockage processing. In other words, an area where a communication service cannot be received occurs due to the blockade.

In another case, if the radio terminal is located outside the cell due to the blockade processing, the radio terminal makes a request to accept a new call to a different radio base station neighboring the blockaded radio base station, i.e. a different radio base station located away from the radio terminal. In this case, even if the new call is accepted, the communication quality may be deteriorated.

Moreover, in the method of the conventional blockade processing described above, the ongoing call is forcefully disconnected after the predetermined time period from the start of the blockade processing. This causes deterioration in the quality of communication service.

In view of the above problem, an object of the present invention is to provide a radio communication system, a radio base station, and a blockade control method for preventing deterioration of quality of communication service.

To solve the above problem, the present invention has following features. A first feature of the invention is summarized as a radio communication system (radio communication system 100) including: a first radio base station (radio base station 1); and a second radio base station (radio base stations 2A to 2F) neighboring the first radio base station, wherein the first radio base station includes: a storage unit (storage unit 103) configured to store information on the second radio base station; a pre-blockade initiate notification transmitter (pre-blockade initiate notification transmitter 154) configured to transmit a pre-blockade initiate notification indicating initiation of a pre-blockade to the second radio base station identified based on the information on the second radio base station stored in the storage unit, in initiating the pre-blockade; and a transmission-power reduction processor (transmission-power reduction processor 156) configured to reduce transmission power, and the second radio base station includes; a pre-blockade initiate notification receiver (pre-blockade initiate notification receiver 162) configured to receive the pre-blockade initiate notification; and a transmission-power increase processor (transmission-power increase processor 166) configured to increase transmission power upon receiving the pre-blockade initiate notification from the pre-blockade initiate notification receiver.

In the radio communication system, a first radio base station to be pre-blockaded reduces a transmission power while second radio base stations near the first radio base station increase transmission powers. Accordingly, when a communication area of the first radio base station becomes smaller, communication areas of the second radio base stations become larger. Thus, the occurrence of an area in which no communication may be prevented, so that the quality of the communication service is not deteriorated.

A second feature of the present invention according to the first feature is summarized as that the transmission-power reduction processor reduces the transmission power in decrements of a predetermined amount in a predetermined time period, and the transmission-power increase processor increases the transmission power in increments of the predetermined amount in the predetermined time period.

A third feature of the present invention according to any one of the first and second features is summarized as that the first radio base station includes a distance measuring unit (distance measuring unit 152) configured to measure a distance between the first radio base station itself and the second radio base station, and the pre-blockade initiate notification transmitter transmits the pre-blockade initiate notification to the second radio base station, the distance from which to the first radio base station measured by the distance measuring unit is equal to or smaller than a predetermined threshold.

A fourth feature of the present invention according to any one of the first to third features is summarized as that the second radio base station includes a direction specifying unit (direction specifying unit 164) configured to specify a direction in which the first radio base station exists, and the transmission-power increase processor increases the transmission power in the direction in which the first radio base station exists, the direction being specified by the direction specifying unit.

A fifth feature of the present invention according to any one of the first to fourth features is summarized as that the first radio base station includes an ongoing-call absence notification transmitter (ongoing-call absence notification transmitter 158) configured to transmit the second radio base station an ongoing-call absence notification indicating that there is no on-going call anymore, when there is no ongoing call anymore in the first radio base station, the second radio base station includes an ongoing-call absence notification receiver (ongoing-call absence notification receiver 168) configured to receive the ongoing-call absence notification, and the transmission-power increase processor stops increasing the transmission power when the ongoing-call absence notification receiver receives the ongoing-call absence notification.

A sixth feature of the present invention according to any one of the first to fifth features is summarized as that the radio communication system further including a base station controller configured to connect the first radio base station and the second radio base station to each other and to control the first radio base station and the second radio base station, wherein the pre-blockade initiate notification transmitter transmits the pre-blockade initiate notification to the second radio base station via the base station controller.

A seventh feature of the present invention is summarized as a radio base station constituting a radio communication system, the radio base station including: a storage unit configured to store information on a different radio base station neighboring the radio base station itself; a pre-blockade initiate notification transmitter configured to transmit a pre-blockade initiate notification indicating initiation of a pre-blockade to the different radio base station identified based on the information on the different radio base station stored in the storage unit, in initiating the pre-blockade; and a transmission-power reduction processor configured to reduce transmission power.

An eighth feature of the present invention is summarized as a radio base station constituting a radio communication system, the radio base station including: a pre-blockade initiate notification receiver configured to receive a pre-blockade initiate notification from a different radio base station, the pre-blockade initiate notification indicating initiation of a pre-blockade in the different radio base station; and a transmission-power increase processor configured to increase transmission power when the pre-blockade initiate notification receiver receives the pre-blockade initiate notification.

A ninth feature of the present invention is summarized as a blockade control method in a radio communication system including a first radio base station and a second radio base station neighboring the first radio base station, the method including the steps of: the first radio base station transmitting a pre-blockade initiate notification indicating initiation of a pre-blockade to the second radio base station identified based on information on the second radio base station stored in a storage unit, when the first radio base station initiates the pre-blockade; the first radio base station reducing transmission power; the second radio base station receiving the pre-blockade initiate notification; and the second radio base station increasing transmission power upon receiving the pre-blockade initiate notification.

A tenth feature of the present invention is summarized as a radio communication system (radio communication system 10) including: a first radio base station (radio base station 1); and a second radio base station (radio base stations 2A to 2F) neighboring the first radio base station, wherein the first radio base station includes: a storage unit (storage unit 103) configured to store information on the second radio base station; a transmitter (pre-blockade initiate notification transmission processor 154) configured to transmit a preparation signal to the second radio base station identified based on the information on the second radio base station stored in the storage unit, before blockade processing is performed; and a transmission-power reduction processor (transmission-power reduction processor 156) configured to reduce transmission power, and the second radio base station includes a receiver (pre-blockade initiate notification receiver 162) configured to receive the preparation signal; a transmission-power increase processor (transmission-power increase processor 166) configured to increase transmission power in accordance with the preparation signal received by the receiver.

An eleventh feature of the present invention is summarized as that the transmission-power reduction processor reduces the transmission power in accordance with a transmission-power reduction rate, and the transmission-power increase processor increases the transmission power in accordance with a transmission-power increase rate.

A twelfth feature of the present invention is summarized as that the first radio base station includes a distance measuring unit (distance measuring unit 152) configured to measure a distance between the first radio base station itself and the second radio base station, and the transmitter transmits the preparation signal to the second radio base station, the distance from which to the first radio base station measured by the distance measuring unit is equal to or smaller than a predetermined threshold.

A thirteenth feature of the present invention is summarized as that the second radio base station includes a direction specifying unit (direction specifying unit 164) configured to specify a direction in which the first radio base station exists, and the transmission-power increase processor increases the transmission power in the direction in which the first radio base station exists, the direction being specified by the direction specifying unit.

A fourteenth feature of the present invention is summarized as that the first radio base station includes an ongoing-call absence notification transmitter (ongoing-call absence notification transmitter 158) configured to transmit the second radio base station an ongoing-call absence notification indicating that there is no on-going call anymore, when there is no ongoing call anymore in the first radio base station, the second radio base station includes an ongoing-call absence notification receiver (ongoing-call absence notification receiver 168) configured to receive the ongoing-call absence notification, and the transmission-power increase processor stops increasing the transmission power when the ongoing-call absence notification receiver receives the ongoing-call absence notification.

A fifteenth feature of the present invention is summarized as the radio communication system further including a base station controller configured to connect the first radio base station and the second radio base station to each other and to control the first radio base station and the second radio base station, wherein the transmitter transmits the preparation signal to the second radio base station via the base station controller.

A sixteenth feature of the present invention is summarized as a radio base station which performs blockade processing including: a storage unit configured to store information on a different radio base station neighboring the radio base station itself; a transmitter configured to transmit a preparation signal to the second radio base station identified based on the information on the different radio base station stored in the storage unit, before blockade processing is performed; and a transmission-power reduction processor configured to reduce transmission power.

A seventeenth feature of the present invention is summarized as a radio base station connected to a blockade radio base station which performs blockade processing, the radio base station including: a receiver configured to receive a preparation signal transmitted from the blockade radio base station before the blockade processing is performed; and a transmission-power increase processor configured to increase transmission power in accordance with the preparation signal received by the receiver.

An eighteenth feature of the present invention is summarized as that the first radio base station includes: a blockade processor (blockade processor 258) configured to measure a reception level of the second radio base station when there is no ongoing call anymore in the first radio base station itself; and a transmission-power-change stop notification transmitter (transmission-power-change stop notification transmitter 259) configured to transmit a transmission-power-change stop notification to the second radio base station, the reception level of which measured by the blockade processor has reached or exceeded a threshold, and the second radio base station includes a transmission-power-change stop notification reception processor (transmission-power-change stop notification reception processor 268) configured to stop the increase of the transmission power upon receiving the transmission-power-change stop notification.

According to the present invention, deterioration of quality of communication service may be prevented. Moreover, according to the present invention, provided are a radio communication system, a radio base station, and a blockade control method which can improve the quality of the communication service by suppressing a disconnection in a part of area during a blockaded processing in a base station.

BRIEF DESCRIPTION OF THE DRAWINGS

FIG. 2 is a configuration diagram of a radio base station of the embodiment of the present invention.

FIG. 3 is a first functional block configuration diagram of a controller in the radio base station of the embodiment of the present invention.

FIG. 12 is a sequence diagram showing an operation of the radio communication system of the additional embodiment.

FIG. 13 is a flowchart showing an operation of a first radio base station of the additional embodiment.

Figure 1:
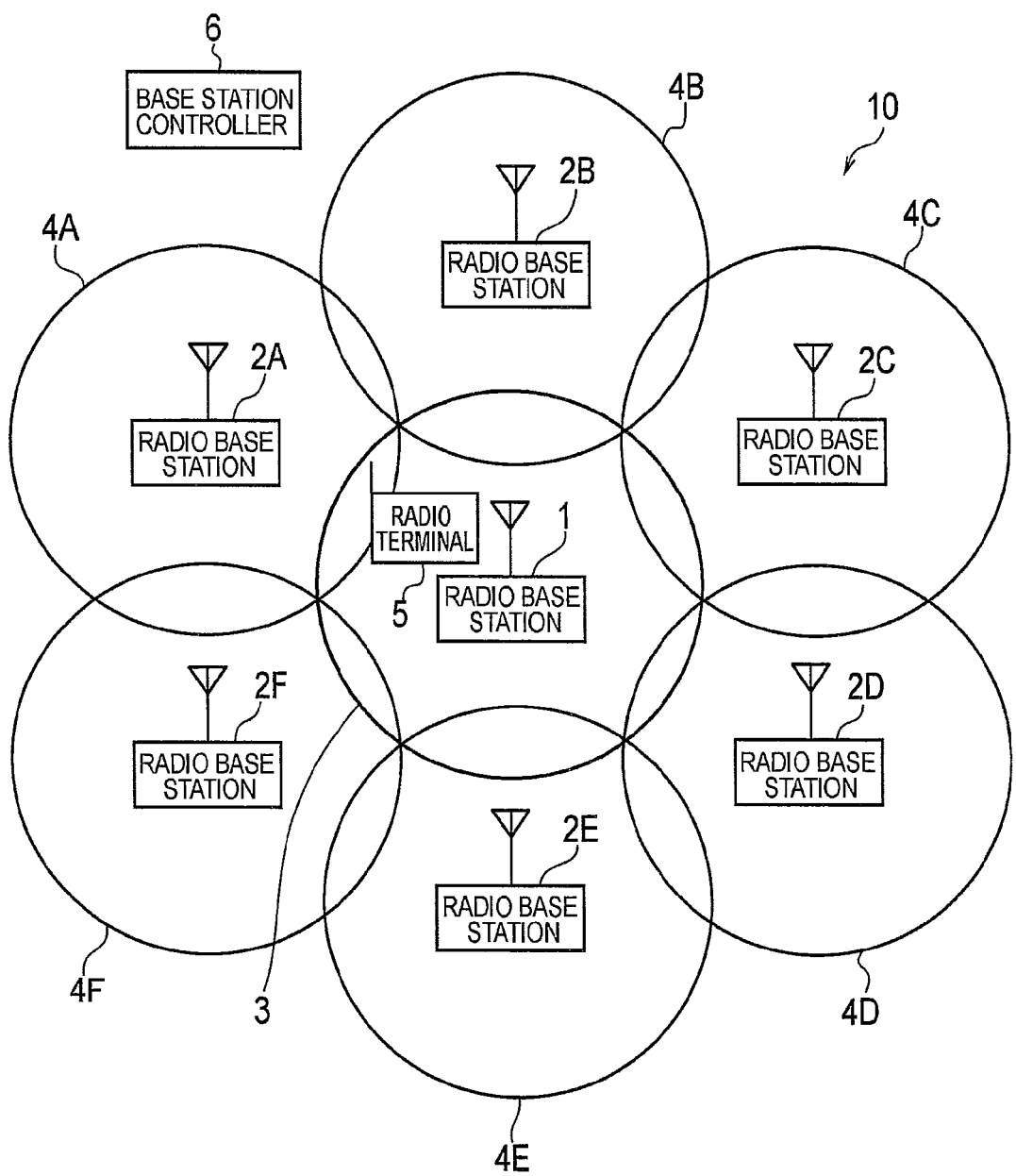
FIG. 1 is an overall schematic configuration diagram of a radio communication system of an embodiment of the present invention.

MODES FOR CARRYING OUT THE INVENTION (First Embodiment)

Next, a first embodiment of the present invention will be described with reference to the drawings. Specifically, descriptions will be given of (1) a configuration of a radio communication system, (2) an operation of a radio base station, (3) advantageous effects, and (4) other embodiments. In the following description of the drawings, same or similar reference numerals denote same or similar elements and portions.

(1) Configuration of Radio Communication System

First, the configuration of the radio communication system of the embodiment of the present invention will be described in the order of (1.1) an overall schematic configuration of the radio communication system and (1.2) a configuration of the radio base station.

(1.1) Overall Schematic Configuration of Radio communication System

FIG. 1 is an overall schematic configuration diagram of a radio communication system 10 of the embodiment of the present invention.

The radio communication system 10 shown in FIG. 1 adopts LTE (Long Term Evolution) which is a standard defined by 3GPP (Third Generation Partnership Project). As shown in FIG. 1, the radio communication system 10 includes a radio base station 1, radio base stations 2A to 2F located around the radio base station 1, and a base station controller 6. The radio communication system 10 provides a radio terminal 5 with a radio communication service.

The radio base station 1 transmits a radio signal at a predetermined transmission power and provides a cell 3 being a communication area. Similarly, the radio base stations 2A to 2F transmit radio signals at predetermined powers and provide cells 4A to 4F being communication areas, respectively. Each of these cells 4A to 4F is radially divided from the corresponding one of the radio base stations 2A to 2F into multiple sectors (not illustrated). In FIG. 1, the radio terminal 5 exists in the cell 3 provided by the radio base station 1. Thus, the radio terminal 5 can transmit and receive radio signals to and from the radio base station.

The base station controller 6 controls the radio base station 1 and the radio base stations 2A to 2F. The base station controller 6 is connected to the radio base station 1 and the radio base stations 2A to 2F by a wired line not illustrated.

(1.2) Configuration of Radio Base Station

FIG. 2 is a configuration diagram of the radio base station 1. As shown in FIG. 2, the radio base station 1 includes a controller 102, a storage unit 103, a wired communication unit 104, a radio communication unit 106, and an antenna 108. Note that, the radio base stations 2A to 2F each have a configuration similar to the radio base station 1.

The controller 102 is formed of a CPU for example, and controls various functions included in the radio base station 1. The storage unit 103 is formed of a memory for example, and stores various types of information used for a control performed in the radio base station 1 and the like.

The wired communication unit 104 transmits and receives data to and from the base station controller 6. The radio communication unit 106 includes a RF circuit, a baseband circuit, and the like, and performs modulation, demodulation, coding, decoding, and the like. The radio communication unit 106 transmits and receives radio signals to and from the radio terminal 5 via the antenna 108.

FIG. 3 is a functional block configuration diagram of the controller 102 in the radio base station 1. As shown in FIG. 3, the controller 102 in the radio base station 1 includes a distance measuring unit 152, a pre-blockade initiate notification transmission processor 154, a transmission-power reduction processor 156, and an ongoing-call absence notification transmission processor 158.

The distance measuring unit 152 measures the distance between the radio base station 1 and a different radio base station.

Figures 4, 5, 6, 7:
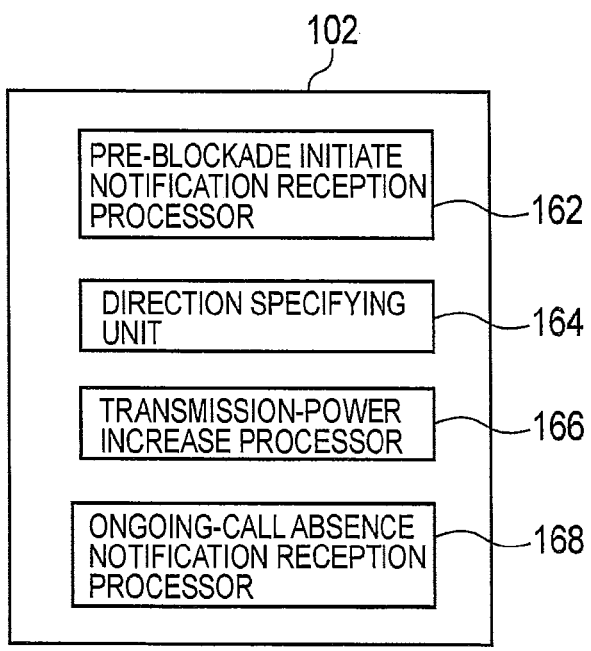
FIG. 4 is a view showing an example of position information of a different radio base station.
FIG. 5 is a view showing an example of a pre-blockade initiate notification.
FIG. 6 is a view showing an example of an ongoing-call absence notification.
FIG. 7 is a second functional block configuration diagram of a controller in the radio base station of the embodiment of the present invention.

Specifically, the storage unit 103 stores therein the longitude and the latitude of the radio base station 1 being this radio base station. Moreover, the storage unit 103 stores therein position information of the different radio base station. FIG. 4 is a view showing an example of position information of a different radio base station. The position information of the different radio base station shown in FIG. 4 includes an ID (base station ID) of the corresponding radio base station and the longitude and the latitude being the position of the corresponding radio base station.

The distance measuring unit 152 measures the distance between the radio base station 1 and the different radio base station on the basis of the longitude and the latitude of the radio base station 1 and the longitude and the latitude of the different radio base station which are stored in the storage unit 103.

The pre-blockade initiate notification transmission processor 154 identifies the base station ID of the different radio base station whose distance from the radio base station 1 is equal to or smaller than a predetermined threshold, on the basis of the distance between the radio base station 1 and each of radio base stations therearound which is measured by the distance measuring unit 152. Here, the pre-blockade initiate notification transmission processor 154 recognizes the radio base stations 2A to 2F as nearby radio base stations whose distances from the radio base station 1 are equal to or smaller than the predetermined threshold, and identifies the base station IDs thereof.

Next, when a request for a pre-blockade processing is made, the pre-blockade initiate notification transmission processor 154 generates a pre-blockade initiate notification indicating that the radio base station 1 is to start pre-blockade. Specifically, the pre-blockade initiate notification transmission processor 154 sets a transmission-power reduction rate indicating a reduction amount of the transmission power per unit time and an initiation time of the pre-blockade, and, in addition, generates the pre-blockade initiate notification whose destinations are set to the radio base stations 2A to 2F corresponding to the identified base station IDs. Here, the initiation time of the pre-blockade is a time obtained by adding a predetermined time period to a time when the pre-blockade is requested by a network manager or the like.

FIG. 5 is a view showing an example of the pre-blockade initiate notification. The pre-blockade initiate notification shown in FIG. 5 includes the base station ID (here, ID of the radio base station 1) of the radio base station being the transmission source of the pre-blockade initiate notification, the base station ID (here, IDs of the radio base stations 2A to 2F) of the radio base station being the destination, the transmission-power reduction rate in the pre-blockade, and the initiation time of the pre-blockade.

Moreover, the pre-blockade initiate notification transmission processor 154 outputs the generated pre-blockade initiate notification to the wired communication unit 104. The wired communication unit 104 transmits the pre-blockade initiate notification to the radio base stations 2A to 2F via the base station controller 6.

When the set initiation time of the pre-blockade comes, the transmission-power reduction processor 156 reduces the transmission power from the antenna 108 in accordance with the set transmission-power reduction rate, and also inhibits reception of a new call from the radio terminal 5.

The ongoing-call absence notification transmission processor 158 judges whether there is an ongoing call in the radio base station 1. For example, if a communication between the radio terminal 5 and the radio base station 1 is being performed, in other words if there is an ongoing call, the radio terminal 5 cannot perform communication with the radio base station 1 after the radio base station 1 reduces the transmission power in accordance with the transmission-power reduction rate. Then, the radio terminal 5 attempts a handover to the radio base station 2A or the like.

When there is no ongoing call, the ongoing-call absence notification transmission processor 158 generates an ongoing-call absence notification. Specifically, the ongoing-call absence notification transmission processor 158 sets a time (power down time) when the transmission power in the radio base station 1 reaches zero, and generates the ongoing-call absence notification whose destinations are set to the radio base stations 2A to 2F corresponding to the base station IDs identified by the pre-blockade initiate notification transmission processor 154. The power down time is a time obtained by adding a predetermined time period to a time when it is judged that there is no ongoing call in the radio base station 1.

FIG. 6 is a view showing an example of the ongoing-call absence notification. The ongoing-call absence notification shown in FIG. 6 includes the base station ID (here, ID of the radio base station 1) of the radio base station being the transmission source of the ongoing-call absence notification, the base station ID (here, IDs of the radio base stations 2A to 2F) of the radio base station being the destination, and the power down time.

Furthermore, the ongoing-call absence notification transmission processor 158 outputs the generated ongoing-call absence notification to the wired communication unit 104. The wired communication unit 104 transmits the ongoing-call absence notification to the radio base stations 2A to 2F via the base station controller 6.

Thereafter, the transmission-power reduction processor 156 performs a control to reduce the transmission power from the antenna 108 to zero when the set power down time comes.

FIG. 7 is a functional block configuration diagram of the controller 102 in the radio base stations 2A to 2F. As shown in FIG. 7, the controller 102 in each of the radio base stations 2A to 2F includes a pre-blockade initiate notification reception processor 162, a direction specifying unit 164, a transmission-power increase processor 166, and an ongoing-call absence notification reception processor 168.

The pre-blockade initiate notification reception processor 162 receives the pre-blockade initiate notification from the radio base station 1 via the base station controller 6 and the wired communication unit 104.

The direction specifying unit 164 specifies a direction in which the radio base station 1 being the transmission source of the pre-blockade initiate notification exists.

Specifically, the storage unit 103 stores therein the longitude and the latitude of the one of the radio base stations 2A to 2F which is this radio base station, as similar to the storage unit 103 in the radio base station 1. Moreover, the storage unit 103 stores therein the position information of the different base stations.

The direction specifying unit 164 extracts the transmission source base station ID in the pre-blockade initiate notification, and identifies a piece of the position information including the extracted transmission source base station ID from the position information of the different base stations stored in the storage unit 103. Then, the direction specifying unit 164 specifies the direction in which the radio base station 1 exists on the basis of the longitude and the latitude in the identified piece of the position information, in other words the longitude and the latitude of the radio base station 1 being the transmission source of the pre-blockade initiate notification, and on the basis of the longitude and the latitude of the radio base station itself stored in the storage unit 103.

The transmission-power increase processor 166 sets an increase amount of the transmission power per unit time (transmission-power increase rate) on the basis of the transmission-power reduction rate in the pre-blockade initiate notification. Specifically, the transmission-power increase processor 166 causes the increase amount of the transmission power per unit time to match the absolute value of the reduction amount of the transmission power per unit time which is indicated by the transmission-power reduction rate.

Furthermore, when the initiation time of the pre-blockade in the pre-blockade initiate notification comes, the transmission-power increase processor 166 increases the transmission power from the antenna 108 in accordance with the set transmission-power increase rate. At this time, the transmission-power increase processor 166 increases only the transmission power of a radio signal directed to a sector in a direction specified by the direction specifying unit 164 among radio signals directed to the sectors constituting the corresponding one of the cells 4A to 4F.

The ongoing-call absence notification reception processor 168 receives the ongoing-call absence notification from the radio base station 1 via the base station controller 6 and the wired communication unit 104.

Thereafter, the transmission-power reduction processor 156 stops the increase of the transmission power from the antenna 108 when the power down time in the ongoing-call absence notification comes, and controls the transmission power to be maintained at a predetermined value. Here, the predetermined value is such a value that the cells 4A to 4F of the radio base stations 2A to 2F include the radio base station 1.

(2) Operation of Radio Communication System

Figure 8:
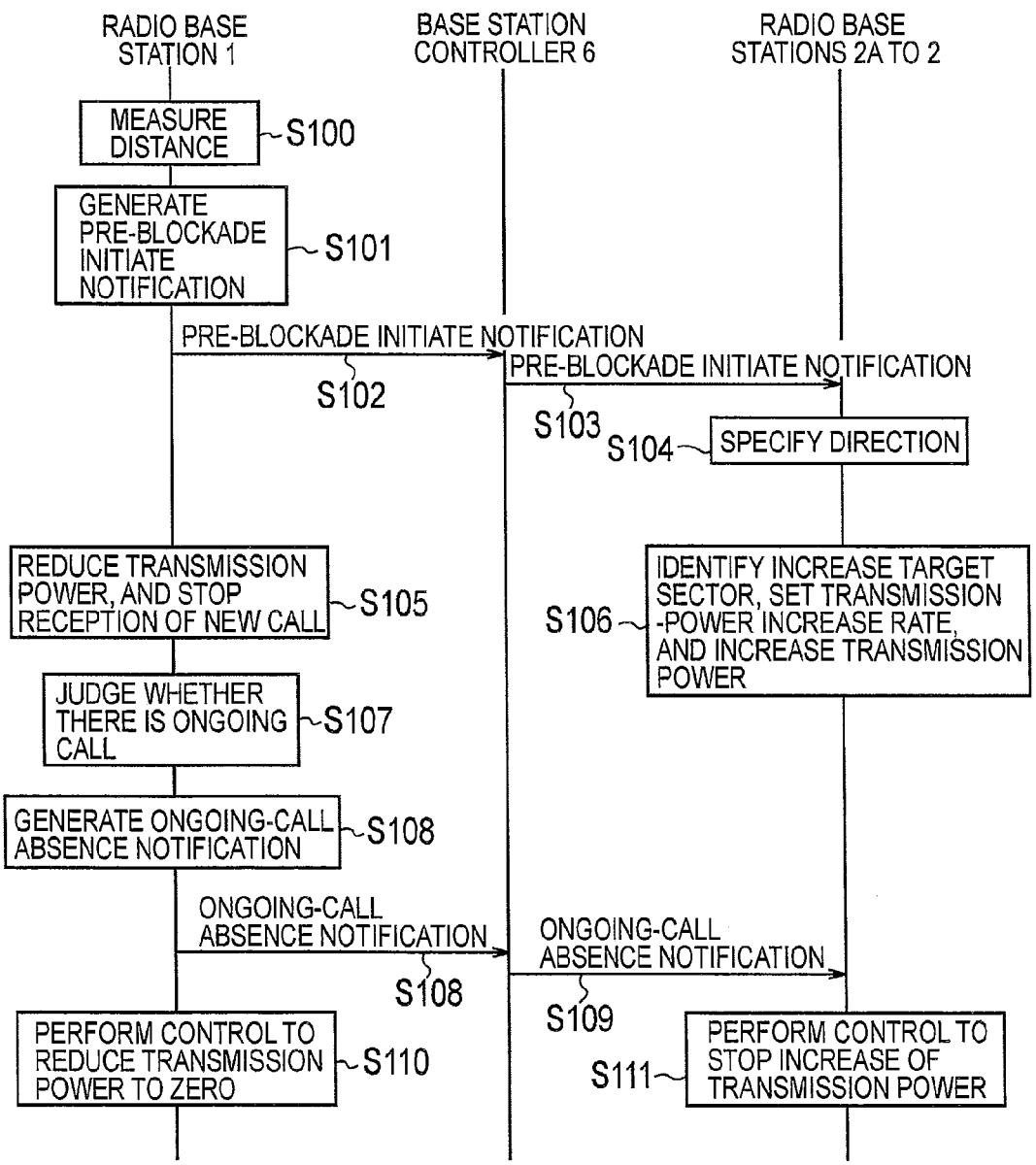
FIG. 8 is a sequence diagram showing an operation of the radio communication system of the embodiment of the present invention.

Next, an operation of the radio communication system 10 will be described. FIG. 8 is a flowchart showing an operation of the radio communication system 10.

In step S100, the controller 102 in the radio base station 1 measures the distance between the radio base station 1 and each of the different radio base stations.

In step S101, when the pre-blockade processing is requested, the controller 102 in the radio base station 1 generates the pre-blockade initiate notification which includes the transmission-power reduction rate and the initiation time of the pre-blockade and whose destinations are set to the radio base stations 2A to 2F each located at such a position that distance therefrom to the radio base station 1 is smaller than the predetermined threshold.

In step S102, the controller 102 in the radio base station 1 transmits the pre-blockade initiate notification to the base station controller 6. The base station controller 6 receives the pre-blockade initiate notification from the radio base station 1. Then, in step S103, the base station controller 6 transmits the pre-blockade initiate notification to the radio base stations 2A to 2F. The controller 102 in each of the radio base stations 2A to 2F receives the pre-blockade initiate notification from the base station controller 6.

In step S104, the controller 102 in each of the radio base stations 2A to 2F specifies the direction in which the radio base station 1 exists.

Thereafter, in step S105, when the set pre-blockade initiation time comes, the controller 102 in the radio base station 1 reduces the transmission power from the antenna 108 in accordance with the set transmission-power reduction rate, and also inhibits reception of a new call from the radio terminal 5.

Meanwhile, in step S106, the controller 102 in each of the radio base stations 2A to 2F identifies a sector in the specified direction in which the radio base station 1 exists as a sector being a target of transmission power increase. Moreover, the controller 102 in each of the radio base stations 2A to 2F sets the transmission-power increase rate in accordance with the transmission-power reduction rate included in the received pre-blockade initiate notification. Furthermore, when the pre-blockade initiation time included in the received pre-blockade initiate notification comes, the controller 102 in each of the radio base stations 2A to 2F reduces the transmission power from the antenna 108 in accordance with the set transmission-power reduction rate.

In step S107, the controller 102 in the radio base station 1 judges whether there is an ongoing call to the radio base station 1. If there is an ongoing call, the reduction of the transmission power in the radio base station 1 in step S105 and the increase of the transmission powers in the radio base stations 2A to 2F in step S106 are continued.

If the communication between the radio terminal 5 and the radio base station 1 is continued, in other words if there is an ongoing call, the radio terminal 5 cannot perform communication with the radio base station 1 after the radio base station 1 reduces the transmission power in accordance with the transmission-power reduction rate, and attempts a handover to the radio base station 2A or the like. Hence, if the reduction of the transmission power in the radio base station 1 and the increase of the transmission powers in the radio base stations 2A to 2F therearound are continued, no ongoing call to the radio base station 1 eventually exists.

On the other hand, if there is no ongoing call, the controller 102 in the radio base station 1 generates the ongoing-call absence notification which includes the power down time and whose destinations are set to the radio base stations 2A to 2F.

In step S108, the controller 102 in the radio base station 1 transmits the ongoing-call absence notification to the base station controller 6. The base station controller 6 receives the ongoing-call absence notification from the radio base station 1. Then, in step S109, the base station controller 6 transmits the ongoing-call absence notification to the radio base stations 2A to 2F. The controller 102 in each of the radio base stations 2A to 2F receives the ongoing-call absence notification from the base station controller 6.

Thereafter, in step S110, when the set power down time comes, the controller 102 in the radio base station 1 performs such a control that the transmission power from the antenna 108 becomes zero.

Meanwhile, in step S111, when the power down time included in the received ongoing-call absence notification comes, the controller 102 in each of the radio base stations 2A to 2F performs such a control that the increase of transmission power from the antenna 108 is stopped and the transmission power is maintained at the predetermined value.

(3) Advantageous Effects

In the radio communication system 10 of the embodiment of the present invention, the radio base station 1 to be pre-blockaded reduces the transmission power while the radio base stations 2A to 2F around the radio base station 1 increase the transmission powers.

Figure 9:
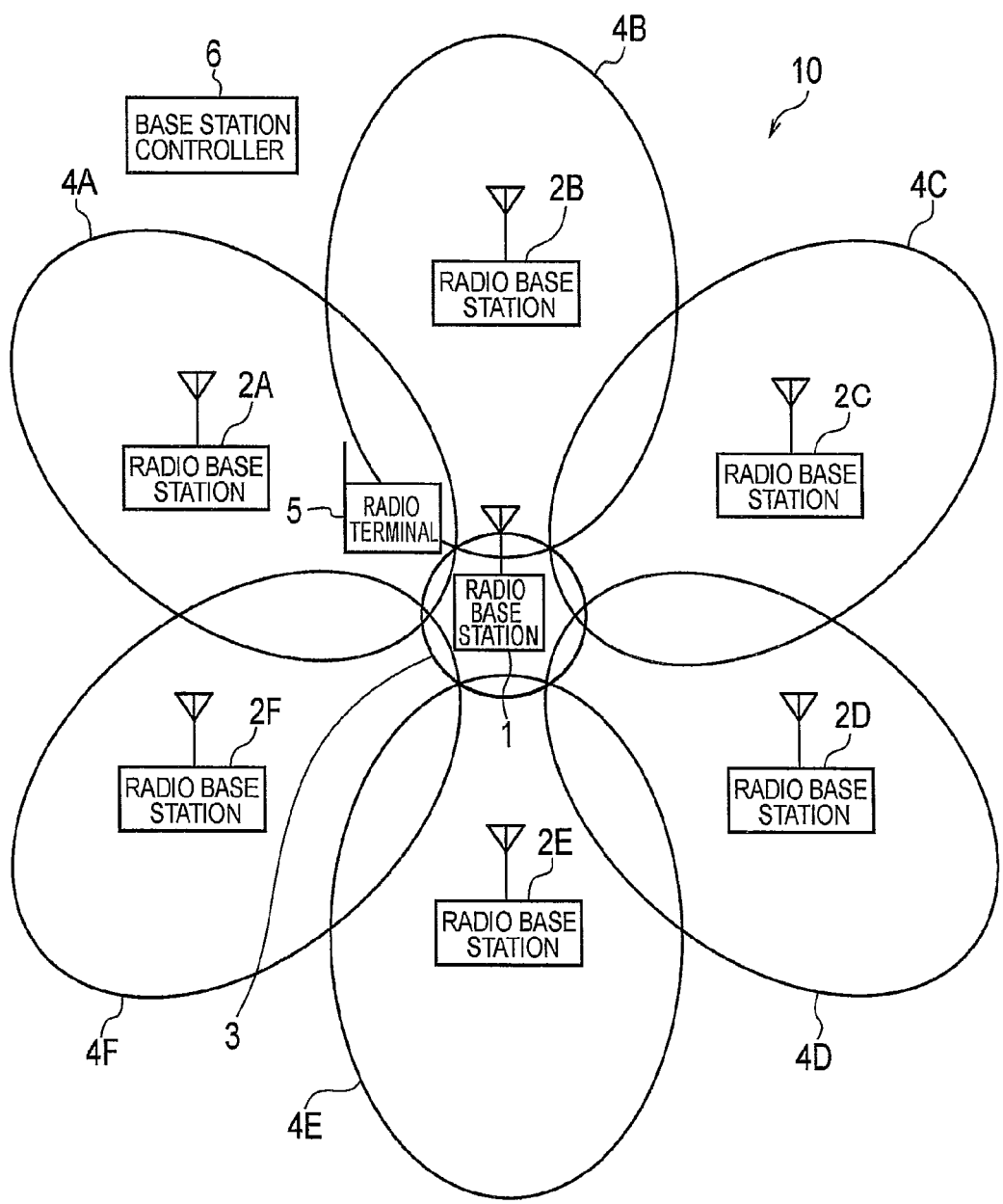
FIG. 9 is an overall schematic configuration diagram of the radio communication system during pre-blockade processing of the embodiment of the present invention.

FIG. 9 is an overall schematic configuration diagram of the radio communication system 10 during pre-blockade processing. By comparing FIG. 9 and FIG. 1, it can be seen that the cell 3 being the communication area of the radio base station 1 becomes smaller while the cells 4A to 4F being the communication areas of the radio base stations 2A to 2F become larger. This prevents a case where an area in which the communication cannot be performed is formed and a new call is not accepted.

Moreover, even if a new call from the radio terminal 5 existing in the cell 3 of the radio base station 1 before the pre-blockade processing is received by one of the radio base stations 2A to 2F, the quality of communication is maintained after the pre-blockade processing, since the cells 4A to 4F being the communication areas of the radio base station 2A to 2F are made larger.

Moreover, the absolute value of the reduction rate of transmission power in the radio base station 1 is equal to the absolute value of the increase rate of transmission power in each of the radio base stations 2A to 2F. In addition, the start timing of the reduction of transmission power in the radio base station 1 is synchronized with the start timing of the increase of transmission power in each of the radio base stations 2A to 2F. Furthermore, the transmission power of the radio base station 1 is gradually reduced, while the transmission power of each of the radio base stations 2A to 2F is gradually increased in accordance with the rate of reduction of the transmission power of the radio base station 1.

Accordingly, the radio terminal 5 (see FIGS. 1 and 9) existing inside the cell 3 of the radio base station 1 before the pre-blockade processing and existing outside the cell 3 of the radio base station 1 in the pre-blockade processing can continuously perform communication by performing a handover to switch from the radio base station 1 to any one of the radio base stations 2A to 2F in the pre-blockade processing. Thus, forced disconnection of the ongoing call is prevented, and the pre-blockade processing can be performed anytime.

In addition, the radio base station 1 transmits the pre-blockade initiate notification to only the radio base stations 2A to 2F being close to the radio base station 1 itself, in other words the radio base stations 2A to 2F capable of including areas being beyond the range of the cell 3 of the radio base station 1 in the pre-blockade processing in the communication areas thereof by increasing the transmission powers thereof, and prompt the radio base stations 2A to 2F to increase the transmission powers thereof. This suppresses unnecessary transmission of the pre-blockade initiate notification and also increase of processing load due to unnecessary increase of transmission power.

Moreover, each of the radio base stations 2A to 2F specifies the direction in which the radio base station 1 exists, and increases the transmission power of a radio signal directed to a sector in that direction but does not increase the transmission power of radio signals directed to other directions. This prevents increase of interference caused in a case where the cells 4A to 4F of the radio base stations 2A to 2F are each enlarged in a shape of a perfect circle and regions overlapping with the cells of the adjacent radio base stations become larger.

Furthermore, the radio base station 1 transmits the ongoing-call absence notification to the radio base stations 2A to 2F if there is no ongoing call to the radio base station 1 itself. At the same timing, the radio base station 1 reduces the transmission power to zero, and the radio base stations 2A to 2F each stops the control of increasing the transmission power and maintains the transmission power at the predetermined value. This prevents a case where the transmission powers of the radio base stations 2A to 2F are continuously increased and the interference is thus increased.

(4) Other Embodiments

As described above, the present invention has been described by using the embodiments. However, it should not be understood that the description and drawings which constitute part of this disclosure limit the present invention. From this disclosure, various alternative embodiments, examples, and operation techniques will be easily found by those skilled in the art.

In the embodiment described above, the radio base station 1 transmits the pre-blockade initiate notification and the ongoing-call absence notification to the radio base stations 2A to 2F via the base station controller 6. However, the notifications may be transmitted directly to the radio base stations 2A to 2F without being transmitted via the base station controller 6.

In the embodiment described above, descriptions are given of the case where the radio base station 1 to be pre-blockaded reduces the transmission power while the radio base stations 2A to 2F located around the radio base station 1 increase the transmission powers. However, the present invention can be similarly applied to a case where one of the radio base stations 2A to 2F is to be pre-blockaded and reduces the transmission power while the radio base station 1 increases the transmission power.

In such case, the controller 102 in the one of the radio base stations 2A to 2F has the functional block configuration shown in FIG. 2, and the controller 102 in the radio base station 1 has the functional block configuration shown in FIG. 6.

As described above, it should be understood that the present invention includes various embodiments which are not described herein. Accordingly, the technical scope of the present invention should be determined only by the matters to define the invention in the scope of claims regarded as appropriate based on the disclosure.

(Second Embodiment)

Next, a second embodiment of the present invention will be described with reference to the drawings. Specifically, descriptions will be given of (1) a configuration of a radio communication system, (2) an operation of a radio base station, (3) advantageous effects, and (4) other embodiments. In the following description of the drawings, same or similar reference numerals denote same or similar elements and portions.

(1) Configuration of Radio Communication System

First, the configuration of the radio communication system of the embodiment of the present invention will be described in the order of (1.1) an overall schematic configuration of the radio communication system and (1.2) a configuration of the radio base station.

(1.1) Overall Schematic Configuration of Radio communication System

FIG. 1 is an overall schematic configuration diagram of a radio communication system 10 of the embodiment of the present invention.

As shown in FIG. 1, the radio communication system 10 includes a radio base station 1, radio base stations 2A to 2F located around the radio base station 1, and a base station controller 6. The radio communication system 10 provides a radio terminal 5 with a radio communication service.

The radio base station 1 transmits a radio signal at a predetermined transmission power and provides a cell 3 being a communication area. Similarly, the radio base stations 2A to 2F transmit radio signals at predetermined powers and provide cells 4A to 4F being communication areas, respectively. Each of these cells 4A to 4F is radially divided from the corresponding one of the radio base stations 2A to 2F into multiple sectors (not illustrated). In FIG. 1, the radio terminal 5 exists in the cell 3 provided by the radio base station 1. Thus, the radio terminal 5 can transmit and receive radio signals to and from the radio base station.

The base station controller 6 controls the radio base station 1 and the radio base stations 2A to 2F. The base station controller 6 is connected to the radio base station 1 and the radio base stations 2A to 2F by a wired line not illustrated.

(1.2) Configuration of Radio Base Station

FIG. 2 is a configuration diagram of the radio base station 1. As shown in FIG. 2, the radio base station 1 includes a controller 102, a storage unit 103, a wired communication unit 104, a radio communication unit 106, and an antenna 108. Note that, the radio base stations 2A to 2F each have a configuration similar to the radio base station 1.

The controller 102 is formed of a CPU for example, and controls various functions included in the radio base station 1. The storage unit 103 is formed of a memory for example, and stores various types of information used for a control performed in the radio base station 1 and the like.

The wired communication unit 104 transmits and receives data to and from the base station controller 6. The radio communication unit 106 includes a RF circuit, a baseband circuit, and the like, and performs modulation, demodulation, coding, decoding, and the like. The radio communication unit 106 transmits and receives radio signals to and from the radio terminal 5 via the antenna 108.

FIG. 3 is a functional block configuration diagram of the controller 102 in the radio base station 1. As shown in FIG. 3, the controller 102 in the radio base station 1 includes a distance measuring unit 152, a pre-blockade initiate notification transmission processor 154, a transmission-power reduction processor 156, and an ongoing-call absence notification transmission processor 158.

The distance measuring unit 152 measures the distance between the radio base station 1 and a different radio base station.

Specifically, the storage unit 103 stores therein the longitude and the latitude of the radio base station 1 being this radio base station. Moreover, the storage unit 103 stores therein position information of the different radio base station. FIG. 4 is a view showing an example of position information of a different radio base station. The position information of the different radio base station shown in FIG. 4 includes an ID (base station ID) of the corresponding radio base station and the longitude and the latitude being the position of the corresponding radio base station.

The distance measuring unit 152 measures the distance between the radio base station 1 and the different radio base station on the basis of the longitude and the latitude of the radio base station 1 and the longitude and the latitude of the different radio base station which are stored in the storage unit 103.

The pre-blockade initiate notification transmission processor 154 identifies the base station ID of the different radio base station whose distance from the radio base station 1 is equal to or smaller than a predetermined threshold, on the basis of the distance between the radio base station 1 and each of radio base stations therearound which is measured by the distance measuring unit 152. Here, the pre-blockade initiate notification transmission processor 154 recognizes the radio base stations 2A to 2F as nearby radio base stations whose distances from the radio base station 1 are equal to or smaller than the predetermined threshold, and identifies the base station IDs thereof.

Next, when a request for a pre-blockade processing is made, the pre-blockade initiate notification transmission processor 154 generates a pre-blockade initiate notification (preparation signal) indicating that the radio base station 1 is to start pre-blockade. Specifically, the pre-blockade initiate notification transmission processor 154 sets a transmission-power reduction rate indicating a reduction amount of the transmission power per unit time and an initiation time of the pre-blockade, and, in addition, generates the pre-blockade initiate notification whose destinations are set to the radio base stations 2A to 2F corresponding to the identified base station IDs. Here, the initiation time of the pre-blockade is a time obtained by adding a predetermined time period (time period with margin) to a time when the pre-blockade is requested by a network manager or the like.

FIG. 5 is a view showing an example of the pre-blockade initiate notification. The pre-blockade initiate notification shown in FIG. 5 includes the base station ID (here, ID of the radio base station 1) of the radio base station being the transmission source of the pre-blockade initiate notification, the base station ID (here, IDs of the radio base stations 2A to 2F) of the radio base station being the destination, the transmission-power reduction rate in the pre-blockade, and the initiation time of the pre-blockade.

Moreover, the pre-blockade initiate notification transmission processor 154 outputs the generated pre-blockade initiate notification to the wired communication unit 104. The wired communication unit 104 transmits the pre-blockade initiate notification to the radio base stations 2A to 2F via the base station controller 6.

When the set initiation time of the pre-blockade comes, the transmission-power reduction processor 156 reduces the transmission power from the antenna 108 in accordance with the set transmission-power reduction rate, and also inhibits reception of a new call from the radio terminal 5.

The ongoing-call absence notification transmission processor 158 judges whether there is an ongoing call in the radio base station 1. For example, if a communication between the radio terminal 5 and the radio base station 1 is being performed, in other words if there is an ongoing call, the radio terminal 5 cannot perform communication with the radio base station 1 after the radio base station 1 reduces the transmission power in accordance with the transmission-power reduction rate. Then, the radio terminal 5 attempts a handover to the radio base station 2A or the like.

When there is no ongoing call, the ongoing-call absence notification transmission processor 158 generates an ongoing-call absence notification. Specifically, the ongoing-call absence notification transmission processor 158 sets a time (power down time) when the transmission power in the radio base station 1 reaches zero, and generates the ongoing-call absence notification whose destinations are set to the radio base stations 2A to 2F corresponding to the base station IDs identified by the pre-blockade initiate notification transmission processor 154. The power down time is a time obtained by adding a predetermined time period (time period with margin) to a time when it is judged that there is no ongoing call in the radio base station 1.

FIG. 6 is a view showing an example of the ongoing-call absence notification. The ongoing-call absence notification shown in FIG. 6 includes the base station ID (here, ID of the radio base station 1) of the radio base station being the transmission source of the ongoing-call absence notification, the base station ID (here, IDs of the radio base stations 2A to 2F) of the radio base station being the destination, and the power down time.

Furthermore, the ongoing-call absence notification transmission processor 158 outputs the generated ongoing-call absence notification to the wired communication unit 104. The wired communication unit 104 transmits the ongoing-call absence notification to the radio base stations 2A to 2F via the base station controller 6.

Thereafter, the transmission-power reduction processor 156 performs a control to reduce the transmission power from the antenna 108 to zero when the set power down time comes.

FIG. 7 is a functional block configuration diagram of the controller 102 in the radio base stations 2A to 2F. As shown in FIG. 7, the controller 102 in each of the radio base stations 2A to 2F includes a pre-blockade initiate notification reception processor 162, a direction specifying unit 164, a transmission-power increase processor 166, and an ongoing-call absence notification reception processor 168.

The pre-blockade initiate notification reception processor 162 receives the pre-blockade initiate notification from the radio base station 1 via the base station controller 6 and the wired communication unit 104.

The direction specifying unit 164 specifies a direction in which the radio base station 1 being the transmission source of the pre-blockade initiate notification exists.

Specifically, the storage unit 103 stores therein the longitude and the latitude of the one of the radio base stations 2A to 2F which is this radio base station, as similar to the storage unit 103 in the radio base station 1. Moreover, the storage unit 103 stores therein the position information of the different base stations.

The direction specifying unit 164 extracts the transmission source base station ID in the pre-blockade initiate notification, and identifies a piece of the position information including the extracted transmission source base station ID from the position information of the different base stations stored in the storage unit 103. Then, the direction specifying unit 164 specifies the direction in which the radio base station 1 exists on the basis of the longitude and the latitude in the identified piece of the position information, in other words the longitude and the latitude of the radio base station 1 being the transmission source of the pre-blockade initiate notification, and on the basis of the longitude and the latitude of the radio base station itself stored in the storage unit 103.

The transmission-power increase processor 166 sets an increase amount of the transmission power per unit time (transmission-power increase rate) on the basis of the transmission-power reduction rate in the pre-blockade initiate notification. Specifically, the transmission-power increase processor 166 causes the increase amount of the transmission power per unit time to match the absolute value of the reduction amount of the transmission power per unit time which is indicated by the transmission-power reduction rate.

Furthermore, when the initiation time of the pre-blockade in the pre-blockade initiate notification comes, the transmission-power increase processor 166 increases the transmission power from the antenna 108 in accordance with the set transmission-power increase rate. At this time, the transmission-power increase processor 166 increases only the transmission power of a radio signal directed to a sector in a direction specified by the direction specifying unit 164 among radio signals directed to the sectors constituting the corresponding one of the cells 4A to 4F.

The ongoing-call absence notification reception processor 168 receives the ongoing-call absence notification from the radio base station 1 via the base station controller 6 and the wired communication unit 104.

Thereafter, the transmission-power reduction processor 156 stops the increase of the transmission power from the antenna 108 when the power down time in the ongoing-call absence notification comes, and controls the transmission power to be maintained at a predetermined value. Here, the predetermined value is such a value that the cells 4A to 4F of the radio base stations 2A to 2F include the radio base station 1.

(2) Operation of Radio Communication System

Next, an operation of the radio communication system 10 will be described. FIG. 8 is a flowchart showing an operation of the radio communication system 10.

In step S100, the controller 102 in the radio base station 1 measures the distance between the radio base station 1 and each of the different radio base stations.

In step S101, when the pre-blockade processing is requested, the controller 102 in the radio base station 1 generates the pre-blockade initiate notification which includes the transmission-power reduction rate and the initiation time of the pre-blockade and whose destinations are set to the radio base stations 2A to 2F each located at such a position that distance therefrom to the radio base station 1 is smaller than the predetermined threshold.

In step S102, the controller 102 in the radio base station 1 transmits the pre-blockade initiate notification to the base station controller 6. The base station controller 6 receives the pre-blockade initiate notification from the radio base station 1. Then, in step S103, the base station controller 6 transmits the pre-blockade initiate notification to the radio base stations 2A to 2F. The controller 102 in each of the radio base stations 2A to 2F receives the pre-blockade initiate notification from the base station controller 6.

In step S104, the controller 102 in each of the radio base stations 2A to 2F specifies the direction in which the radio base station 1 exists.

Thereafter, in step S105, when the set pre-blockade initiation time comes, the controller 102 in the radio base station 1 reduces the transmission power from the antenna 108 in accordance with the set transmission-power reduction rate, and also inhibits reception of a new call from the radio terminal 5. As for the reduction of transmission power in accordance with the transmission-power reduction rate, the transmission power may be reduced in decrements of a constant amount for every constant time period, or reduced in a continuous time period.

Meanwhile, in step S106, the controller 102 in each of the radio base stations 2A to 2F identifies a sector in the specified direction in which the radio base station 1 exists as a sector being a target of transmission power increase. Moreover, the controller 102 in each of the radio base stations 2A to 2F sets the transmission-power increase rate in accordance with the transmission-power reduction rate included in the received pre-blockade initiate notification. Furthermore, when the pre-blockade initiation time included in the received pre-blockade initiate notification comes, the controller 102 in each of the radio base stations 2A to 2F reduces the transmission power from the antenna 108 in accordance with the set transmission-power reduction rate.

In step S107, the controller 102 in the radio base station 1 judges whether there is an ongoing call to the radio base station 1. If there is an ongoing call, the reduction of the transmission power in the radio base station 1 in step S105 and the increase of the transmission powers in the radio base stations 2A to 2F in step S106 are continued. Note that, the operation of step S107 is performed periodically.

If the communication between the radio terminal 5 and the radio base station 1 is continued, in other words if there is an ongoing call, the radio terminal 5 cannot perform communication with the radio base station 1 after the radio base station 1 reduces the transmission power in accordance with the transmission-power reduction rate, and attempts a handover to the radio base station 2A or the like. Hence, if the reduction of the transmission power in the radio base station 1 and the increase of the transmission powers in the radio base stations 2A to 2F thereuround are continued, no ongoing call to the radio base station 1 eventually exists.

On the other hand, if there is no ongoing call, the controller 102 in the radio base station 1 generates the ongoing-call absence notification which includes the power down time and whose destinations are set to the radio base stations 2A to 2F.

In step S108, the controller 102 in the radio base station 1 transmits the ongoing-call absence notification to the base station controller 6. The base station controller 6 receives the ongoing-call absence notification from the radio base station 1. Then, in step S109, the base station controller 6 transmits the ongoing-call absence notification to the radio base stations 2A to 2F. The controller 102 in each of the radio base stations 2A to 2F receives the ongoing-call absence notification from the base station controller 6.

Thereafter, in step S110, when the set power down time comes, the controller 102 in the radio base station 1 performs such a control that the transmission power from the antenna 108 becomes zero.

Meanwhile, in step S111, when the power down time included in the received ongoing-call absence notification comes, the controller 102 in each of the radio base stations 2A to 2F performs such a control that the increase of transmission power from the antenna 108 is stopped and the transmission power is maintained at the predetermined value.

(3) Advantageous Effects

In the radio communication system 10 of the embodiment of the present invention, the radio base station 1 to be pre-blockaded reduces the transmission power while the radio base stations 2A to 2F around the radio base station 1 increase the transmission powers.

FIG. 8 is an overall schematic configuration diagram of the radio communication system 10 during pre-blockade processing. By comparing FIG. 8 and FIG. 1, it can be seen that the cell 3 being the communication area of the radio base station 1 becomes smaller while the cells 4A to 4F being the communication areas of the radio base stations 2A to 2F become larger. This prevents a case where an area in which the communication cannot be performed is formed and a new call is not accepted.

Moreover, since the cells 4A to 4F being the communication areas of the radio base stations 2A to 2F are made larger, the call from the radio terminal 5 existing in the cell 3 of the radio base station 1 before the pre-blockade processing can be handed over to one of the radio base stations 2A to 2F, and the quality of communication of the ongoing call can be maintained.

Moreover, the absolute value of the reduction rate of transmission power in the radio base station 1 is equal to the absolute value of the increase rate of transmission power in each of the radio base stations 2A to 2F. In addition, the start timing of the reduction of transmission power in the radio base station 1 is synchronized with the start timing of the increase of transmission power in each of the radio base stations 2A to 2F. Furthermore, the transmission power of the radio base station 1 is gradually reduced, while the transmission power of each of the radio base stations 2A to 2F is gradually increased in accordance with the rate of reduction of the transmission power of the radio base station 1.

Accordingly, the radio terminal 5 (see FIGS. 1 and 8) existing inside the cell 3 of the radio base station 1 before the pre-blockade processing and existing outside the cell 3 of the radio base station 1 in the pre-blockade processing can continuously perform communication by performing a handover to switch from the radio base station 1 to any one of the radio base stations 2A to 2F in the pre-blockade processing. Thus, forced disconnection of the ongoing call is prevented, and the pre-blockade processing can be performed anytime.

Moreover, the radio base station 1 transmits the pre-blockade initiate notification to the radio base stations 2A to 2F within a certain range from the radio base station 1 itself, and causes those radio base stations to increase the transmission powers. Thus, the cell 3 of the radio base station 1 itself is covered with the cells of the different radio base stations. Accordingly, different radio base stations outside the certain range from the radio base station 1 itself are not affected (In other words, if the pre-blockade initiate notification transmission is transmitted to the different radio base stations outside the certain range, unnecessary increase in the transmission power and increase in processing load can be suppressed).

In addition, if each of the cells 4A to 4F of the radio base stations 2A to 2F within the certain range from the radio base station 1 is enlarged in a shape of a perfect circle, regions overlapping with the cells of the adjacent radio base stations become larger. Thus, each of the radio base stations 2A to 2F specifies the direction in which the radio base station 1 exists, and increases the transmission power of a radio signal directed to a sector in that direction but does not increase the transmission power of the radio signals directed to the other directions. Thus, the radio base stations 2A to 2F prevent increase of interference caused due to the regions where the cells of the adjacent radio base stations overlap each other becoming larger.

Furthermore, the radio base station 1 transmits the ongoing-call absence notification to the radio base stations 2A to 2F and also reduces the transmission power to zero. Each of the radio base stations 2A to 2F having received the ongoing-call absence notification stops the control of increasing the transmission power, and maintains the transmission power at the predetermined value. This prevents a case where the transmission powers of the radio base stations 2A to 2F are continuously increased and the interference is thus increased.

(4) Other Embodiments

As described above, the present invention has been described by using the embodiments. However, it should not be understood that the description and drawings which constitute part of this disclosure limit the present invention. From this disclosure, various alternative embodiments, examples, and operation techniques will be easily found by those skilled in the art.

In the embodiment described above, the radio base station 1 transmits the pre-blockade initiate notification and the ongoing-call absence notification to the radio base stations 2A to 2F via the base station controller 6. However, the notifications may be transmitted directly to the radio base stations 2A to 2F without being transmitted via the base station controller 6.

In the embodiment described above, descriptions are given of the case where the radio base station 1 to be pre-blockaded reduces the transmission power while the radio base stations 2A to 2F located around the radio base station 1 increase the transmission powers. However, the present invention can be similarly applied to a case where one of the radio base stations 2A to 2F is to be pre-blockaded and reduces the transmission power while the radio base station 1 increases the transmission power. In such case, the controller 102 in the one of the radio base stations 2A to 2F has the functional block configuration shown in FIG. 2, and the controller 102 in the radio base station 1 has the functional block configuration shown in FIG. 6.

An additional embodiment is described below. Note that, the additional embodiment is an embodiment in which it is checked whether the communication area covered by a radio base station 1 can be covered by an adjacent radio base station in the pre-blockade processing, before the radio base station 1 turns off the transmission power. In the descriptions below of a controller 102 shown in FIG. 10, components which are the same as those described in "(1) Configuration of Radio Communication System" are denoted with the same reference numerals.

Figure 10:
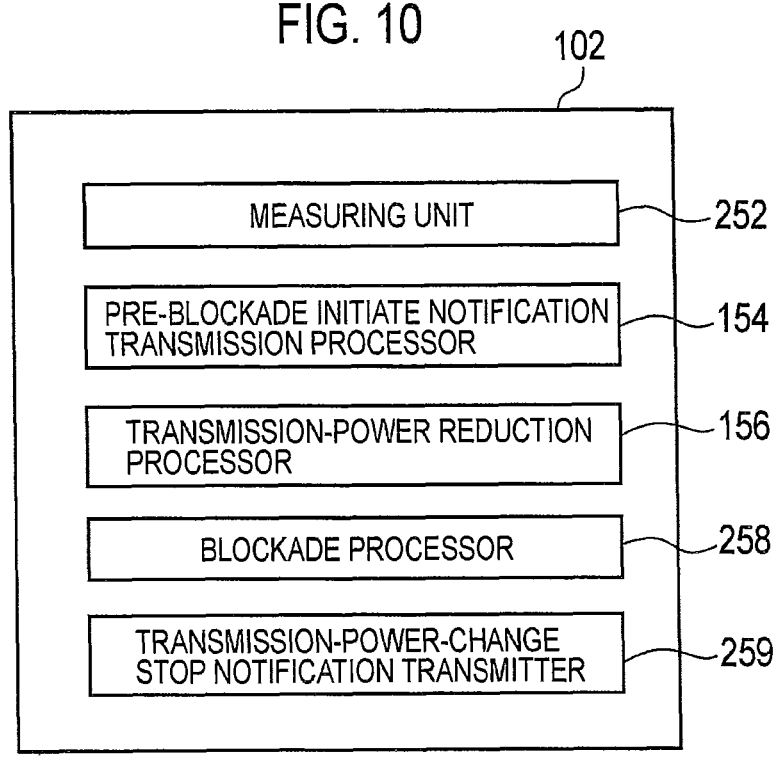
FIG. 10 is a first functional block configuration diagram of a controller in a radio base station of an additional embodiment.

FIG. 10 is a block diagram of the controller 102 of the radio base station 1. As shown in FIG. 10, the controller 102 in the radio base station 1 includes a measuring unit 252, a pre-blockade initiate notification transmission processor 154, a transmission-power reduction processor 156, a blockade processor 258, and a transmission-power-change stop notification transmitter 259.

Figure 11:
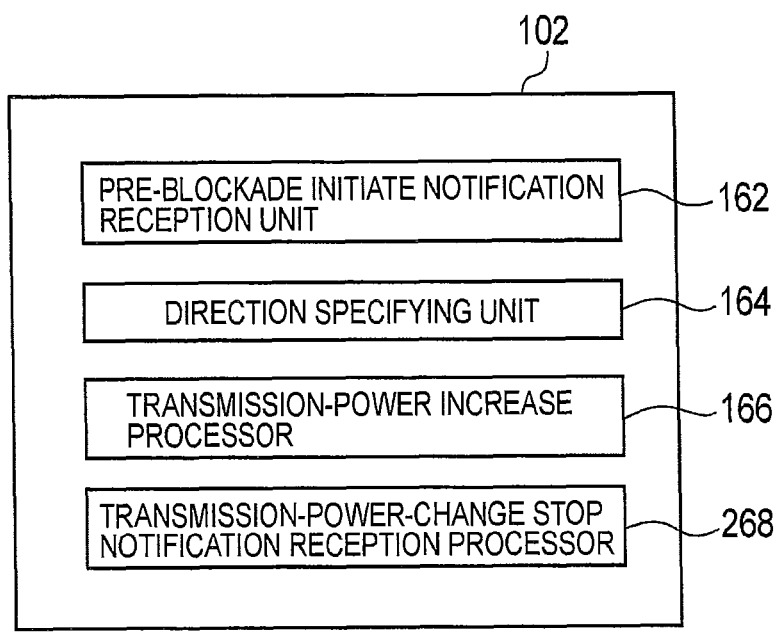
FIG. 11 is a second functional block configuration diagram of a controller in a radio base station of the additional embodiment.

FIG. 11 is a block diagram of a controller 102 of a radio base station 2. As shown in FIG. 11, the controller 102 of the radio base station 2 includes a pre-blockade initiate notification reception processor 162, a direction specifying unit 164, a transmission-power increase processor 166, and a transmission-power-change stop notification reception processor 268.

FIG. 12 is a flowchart showing an operation of the radio communication system of the additional embodiment.

In step S200, the controller 102 (measuring unit 252) in the radio base station 1 measures the distance between the radio base station 1 and different radio base stations, and also measures a reception level (for example, RSSI) of the different radio base stations. When the pre-blockade processing is requested, the controller 102 (pre-blockade initiate notification transmission processor 154) in the radio base station 1 makes the following determination in step S201. Among radio base stations 2A to 2F whose distances to the radio base station 1 are equal to or smaller than a predetermined threshold, a radio base station whose reception level (for example, RSSI) of the different radio base station is equal to or larger than a certain level is determined as an adjacent base station.

In step S201, the controller 102 (pre-blockade initiate notification transmission processor 154) in the radio base station 1 generates a pre-blockade initiate notification (preparation signal) which includes a transmission-power reduction rate and a pre-blockade initiation time and whose destination is set to the adjacent base station.

In step S102, the controller 102 (pre-blockade initiate notification transmission processor 154) in the radio base station 1 transmits the pre-blockade initiate notification to the base station controller 6. The base station controller 6 receives the pre-blockade initiate notification from the radio base station 1. Then, in step S103, the base station controller 6 transmits the pre-blockade initiate notification to the adjacent base station. The controller 102 (pre-blockade initiate notification reception processor 162) in the adjacent base station receives the pre-blockade initiate notification from the base station controller 6.

In step S104, the controller 102 (direction specifying unit 164) in the adjacent base station specifies the direction in which the radio base station 1 exists.

Thereafter, in step S105, when the set pre-blockade initiation time comes, the controller 102 (transmission-power reduction processor 156) in the radio base station 1 reduces the transmission power from the antenna 108 in accordance with the set transmission-power reduction rate, and also inhibits reception of a new call from the radio terminal 5.

Meanwhile, in step S106, the controller 102 (direction specifying unit 164) in the adjacent base station indentifies a sector in the specified direction in which the radio base station 1 exists as a sector being a target of transmission power increase. Moreover, the controller 102 (transmission-power increase processor 166) in the adjacent base station indentifies sets the transmission-power increase rate in accordance with the transmission-power reduction rate included in the received pre-blockade initiate notification. Furthermore, when the pre-blockade initiation time included in the received pre-blockade initiate notification comes, the controller 102 in the adjacent base station reduces the transmission power from the antenna 108 in accordance with the set transmission-power reduction rate.

In step S107, the controller 102 (blockade processor 258) in the radio base station 1 judges whether there is an ongoing call to the radio base station 1. If there is an ongoing call, the reduction of the transmission power in the radio base station 1 in step S105 and the increase of the transmission powers in the radio base stations 2A to 2F in step S106 are continued. Note that, the operation of step S107 is performed periodically.

If the communication between the radio terminal 5 and the radio base station 1 is continued, in other words if there is an ongoing call, the radio terminal 5 cannot perform communication with the radio base station 1 after the radio base station 1 reduces the transmission power in accordance with the transmission-power reduction rate, and attempts a handover to the radio base station 2A or the like. Hence, if the reduction of the transmission power in the radio base station 1 and the increase of the transmission powers in the adjacent base station are continued, no ongoing call to the radio base station 1 eventually exists.

Meanwhile, if there is no ongoing call, the controller 102 (blockade processor 258) in the radio base station 1 performs a control (off-air) of reducing the transmission power from the antenna 108 to zero in step S110.

Next, in step S202, the controller 102 (blockade processor 258) in the radio base station 1 monitors a signal strength (RSSI) from the adjacent base station, and judges whether the signal strength has reached or exceeded a certain threshold. If the signal strength has reached or exceeded the certain threshold, the controller 102 (transmission-power-change stop notification transmitter 259) in the radio base station 1 transmits a transmission-power-change stop notification to the corresponding adjacent base station in step S203. In step S204, the base station controller 6 having received the transmission-power-change stop notification relays and transmits the transmission-power-change stop notification to the adjacent base station being a target.

Then, in step S111, the controller 102 (transmission-power-change stop notification reception processor 268) of the adjacent base station stops the increase of the transmission power from the antenna 108 upon receiving the transmission-power-change stop notification, and performs a control to maintain the increased transmission power.

FIG. 13 is a flowchart showing an operation of the radio base station 1 of the additional embodiment. The distance between the radio base station 1 and each of the different radio base stations and the reception level of each of the different radio base stations are already known.

When the pre-blockade processing is requested, the controller 102 (measuring unit 252) in the radio base station 1 makes the following determination in step S201. Among the radio base stations 2A to 2F whose distance to the radio base station 1 is equal to or smaller than the predetermined threshold, a radio base station whose reception level (for example RSSI) is equal to or larger than a certain level is determined as an adjacent base station.

In step S102, the controller 102 (pre-blockade initiate notification transmission processor 154) in the radio base station 1 transmits the base station controller 6 the pre-blockade initiate notification which includes the transmission-power reduction rate and the pre-blockade initiation time and whose destination is set to the adjacent base station. Thereafter, in step S105, when the set pre-blockade initiation time comes, the controller 102 (transmission-power reduction processor 156) in the radio base station 1 reduces the transmission power from the antenna 108 in accordance with the set transmission-power reduction rate, and also inhibits reception of a new call from the radio terminal 5.

In step S107, the controller 102 (blockade processor 258) in the radio base station 1 judges whether there is an ongoing call to the radio base station 1. If there is an ongoing call, the reduction of transmission power in the radio base station 1 in step S105 and the increase of transmission power in the adjacent base station are continued. On the other hand, if there is no ongoing call, the controller 102 (blockade processor 258) in the radio base station 1 performs the control (off-air) of reducing the transmission power from the antenna 108 to zero in step S110.

Next, in step S202, the controller 102 (blockade processor 258) in the radio base station 1 judges whether the reception level from the adjacent base station has reached or exceeded the certain threshold. If the reception level has reached or exceeded the threshold, the controller 102 (transmission-power-change stop notification transmitter 259 of the radio base station 1 transmits the transmission-power-change stop notification to the corresponding adjacent base station in step S203. If the reception level is smaller than the threshold, step S202 is repeated.

As described above, in the additional embodiment, it is checked whether the communication area covered by the radio base station 1 can be covered by the adjacent radio base station, before the radio base station 1 turns off the transmission power. Thus, a stable communication service is provided to the radio terminal without having the connection area temporarily in a disconnection state due to the pre-blockade processing.

Note that the entire content of Japanese Patent Application No. 2009-043192 (filed on Feb. 25, 2009) and the entire content of Japanese Patent Application No. 2009-144055 (filed on Jun. 17, 2009) are incorporated herein by reference.

Industrial Applicability

A radio communication system, a radio base station, and a blockade control method of the present invention prevent deterioration of quality of communication service and are useful as a radio communication system and the like.

The invention claimed is:

1. A radio communication system comprising:
    a first radio base station; and
    a second radio base station neighboring the first radio base station,
    wherein the first radio base station includes:
        a storage unit configured to store information on the second radio base station;
        a pre-blockade initiate notification transmitter configured to transmit a pre-blockade initiate notification indicating initiation of a pre-blockade to the second radio base station identified based on the information on the second radio base station stored in the storage unit, in initiating the pre-blockade wherein the pre-blockade is an operation of setting to receive no new call which is a call newly made by a radio terminal and of waiting until an ongoing call is terminated; and
        a transmission-power reduction processor configured to reduce transmission power based on a transmission of the pre-blockade initiate notification, and
    the second radio base station includes:
        a pre-blockade initiate notification receiver configured to receive the pre-blockade initiate notification; and
        a transmission-power increase processor configured to increase transmission power upon receiving the pre-blockade initiate notification from the pre-blockade initiate notification receiver.

2. The radio communication system according to claim 1, wherein the transmission-power reduction processor reduces the transmission power in decrements of a predetermined amount in a predetermined time period, and
    the transmission-power increase processor increases the transmission power in increments of the predetermined amount in the predetermined time period.

3. The radio communication system according to claim 1, wherein the first radio base station includes a distance measuring unit configured to measure a distance between the first radio base station itself and the second radio base station, and
    the pre-blockade initiate notification transmitter transmits the pre-blockade initiate notification to the second radio base station, the distance from which to the first radio base station measured by the distance measuring unit is equal to or smaller than a predetermined threshold.

4. The radio communication system according to claim 1, wherein the second radio base station includes a direction specifying unit configured to specify a direction in which the first radio base station exists, and
    the transmission-power increase processor increases the transmission power in the direction in which the first radio base station exists, the direction being specified by the direction specifying unit.

5. The radio communication system according to claim 1, wherein the first radio base station includes an ongoing-call absence notification transmitter configured to transmit the second radio base station an ongoing-call absence notification indicating that there is no on-going call anymore, when there is no ongoing call anymore in the first radio base station, the second radio base station includes an ongoing-call absence notification receiver configured to receive the ongoing-call absence notification, and
    the transmission-power increase processor stops increasing the transmission power when the ongoing-call absence notification receiver receives the ongoing-call absence notification.

6. The radio communication system according to claim 1 further comprising a base station controller configured to connect the first radio base station and the second radio base station to each other and to control the first radio base station and the second radio base station,
    wherein the pre-blockade initiate notification transmitter transmits the pre-blockade initiate notification to the second radio base station via the base station controller.

7. A radio base station constituting a radio communication system, the radio base station comprising:
    a storage unit configured to store information on a different radio base station neighboring the radio base station itself;
    a pre-blockade initiate notification transmitter configured to transmit a pre-blockade initiate notification indicating initiation of a pre-blockade to the different radio base station identified based on the information on the different radio base station stored in the storage unit, in initiating the pre-blockade wherein the pre-blockade is an operation of setting to receive no new call which is a call newly made by a radio terminal and of waiting until an ongoing call is terminated; and
    a transmission-power reduction processor configured to reduce transmission power based on a transmission of the pre-blockade initiate notification.

8. A radio base station constituting a radio communication system, the radio base station comprising:

a pre-blockade initiate notification receiver configured to receive a pre-blockade initiate notification from a different radio base station, the pre-blockade initiate notification indicating initiation of a pre-blockade in the different radio base station, wherein the pre-blockade is an operation of setting to receive no new call which is a call newly made by a radio terminal and of waiting until an ongoing call is terminated; and a transmission-power increase processor configured to increase transmission power when the pre-blockade initiate notification receiver receives the pre-blockade initiate notification.

9. A blockade control method in a radio communication system including a first radio base station and a second radio base station neighboring the first radio base station, the method comprising the steps of:

the first radio base station transmitting a pre-blockade initiate notification indicating initiation of a pre-blockade to the second radio base station identified based on information on the second radio base station stored in a storage unit, when the first radio base station initiates the pre-blockade, wherein the pre-blockade is an operation of setting to receive no new call which is a call newly made by a radio terminal and of waiting until an ongoing call is terminated;

the first radio base station reducing transmission power based on a transmission of the pre-blockade initiate notification;

the second radio base station receiving the pre-blockade initiate notification; and the second radio base station increasing transmission power upon receiving the pre-blockade initiate notification.

10. A radio communication system comprising:

a first radio base station; and a second radio base station neighboring the first radio base station, wherein the first radio base station includes:
  a storage unit configured to store information on the second radio base station;
  a transmitter configured to transmit a preparation signal to the second radio base station identified based on the information on the second radio base station stored in the storage unit, before blockade processing is performed;
  a transmission-power reduction processor configured to reduce transmission power;
  a blockade processor configured to measure a reception level of the second radio base station when there is no ongoing call anymore in the first radio base station itself; and
  a transmission-power-change stop notification transmitter configured to transmit a transmission-power-change stop notification to the second radio base station, the reception level of which measured by the blockade processor has reached or exceeded a threshold, and the second radio base station includes:
  a receiver configured to receive the preparation signal;
  a transmission-power increase processor configured to increase transmission power in accordance with the preparation signal received by the receiver; and
  a transmission-power-change stop notification reception processor configured to stop the increase of the transmission power upon receiving the transmission-power-change stop notification.

11. The radio communication system according to claim 10, wherein the transmission-power reduction processor reduces the transmission power in accordance with a transmission-power reduction rate, and the transmission-power increase processor increases the transmission power in accordance with a transmission-power increase rate.

12. The radio communication system according to claim 10, wherein the first radio base station includes a distance measuring unit configured to measure a distance between the first radio base station itself and the second radio base station, and the transmitter transmits the preparation signal to the second radio base station, the distance from which to the first radio base station measured by the distance measuring unit is equal to or smaller than a predetermined threshold.

13. The radio communication system according to claim 10, wherein the second radio base station includes a direction specifying unit configured to specify a direction in which the first radio base station exists, and the transmission-power increase processor increases the transmission power in the direction in which the first radio base station exists, the direction being specified by the direction specifying unit.

14. A radio communication system comprising:

a first radio base station; and a second radio base station neighboring the first radio base station, wherein the first radio base station includes:
  a storage unit configured to store information on the second radio base station;
  a transmitter configured to transmit a preparation signal to the second radio base station identified based on the information on the second radio base station stored in the storage unit, before blockade processing is performed; and
  a transmission-power reduction processor configured to reduce transmission power, and the second radio base station includes:
  a receiver configured to receive the preparation signal; and
  a transmission-power increase processor configured to increase transmission power in accordance with the preparation signal received by the receiver, wherein the first radio base station includes an ongoing-call absence notification transmitter configured to transmit the second radio base station an ongoing-call absence notification indicating that there is no on-going call anymore, when there is no ongoing call anymore in the first radio base station, the second radio base station includes an ongoing-call absence notification receiver configured to receive the ongoing-call absence notification, and the transmission-power increase processor stops increasing the transmission power when the ongoing-call absence notification receiver receives the ongoing-call absence notification.

15. The radio communication system according to claim 10 further comprising a base station controller configured to connect the first radio base station and the second radio base station to each other and to control the first radio base station and the second radio base station, wherein the transmitter transmits the preparation signal to the second radio base station via the base station controller.

16. A radio base station which performs blockade processing comprising:
- a storage unit configured to store information on a different radio base station neighboring the radio base station itself;
- a transmitter configured to transmit a preparation signal to the different radio base station identified based on the information on the different radio base station stored in the storage unit, before blockade processing is performed;
- a transmission-power reduction processor configured to reduce transmission power;
- a blockade processor configured to measure a reception level of the different radio base station when there is no ongoing call anymore in the radio base station itself; and
- a transmission-power-change stop notification transmitter configured to transmit a transmission-power-change stop notification to the different radio base station, the reception level of which measured by the blockade processor has reached or exceeded a threshold.

17. A radio base station connected to a blockade radio base station which performs blockade processing, the radio base station comprising:
- a receiver configured to receive a preparation signal transmitted from the blockade radio base station before the blockade processing is performed;
- a transmission-power increase processor configured to increase transmission power in accordance with the preparation signal received by the receiver;
- an ongoing-call absence notification receiver configured to receive the ongoing-call absence notification, and
- the transmission-power increase processor stops increasing the transmission power when the ongoing-call absence notification receiver receives the ongoing-call absence notification.

* * * * *